(12) United States Patent
Brissette

(10) Patent No.: US 7,143,161 B2
(45) Date of Patent: Nov. 28, 2006

(54) TANDEM CONNECTION MONITORING PARALLEL PROCESSING

(75) Inventor: Patrice Brissette, Hull (CA)

(73) Assignee: Nortel Networks Limited, St. Laurent (CA)

(*) Notice: Subject to any disclaimer, the term of this patent is extended or adjusted under 35 U.S.C. 154(b) by 749 days.

(21) Appl. No.: 09/987,788

(22) Filed: Nov. 16, 2001

(65) Prior Publication Data

US 2003/0097472 A1 May 22, 2003

(51) Int. Cl.
*G06F 15/16* (2006.01)
(52) U.S. Cl. ............... 709/224; 709/223; 709/236; 709/245; 709/251; 370/220; 370/241; 370/242
(58) Field of Classification Search ........ 709/245, 709/236, 238, 223, 251, 224; 370/241, 242, 370/222, 220
See application file for complete search history.

(56) References Cited

U.S. PATENT DOCUMENTS

| | | | | |
|---|---|---|---|---|
| 4,987,568 | A * | 1/1991 | Shinada et al. | 370/249 |
| 5,555,248 | A * | 9/1996 | Sugawara | 714/704 |
| 6,104,702 | A * | 8/2000 | Vissers | 370/241 |
| 6,452,906 | B1 * | 9/2002 | Afferton et al. | 370/242 |
| 6,577,594 | B1 * | 6/2003 | Abbas et al. | 370/222 |
| 6,735,736 | B1 * | 5/2004 | Korall et al. | 714/776 |
| 6,798,748 | B1 * | 9/2004 | Hessler et al. | 370/242 |
| 6,859,453 | B1 * | 2/2005 | Pick et al. | 370/358 |
| 6,978,464 | B1 * | 12/2005 | McDonald et al. | 719/319 |
| 2002/0095525 | A1 * | 7/2002 | Fables et al | 709/318 |

FOREIGN PATENT DOCUMENTS

EP 0 964 543 A2 2/1999

OTHER PUBLICATIONS

Chronos Technology Ltd—etsi & itu-t standards: Feb. 22, 2006, http://www.chronos.co.uk/pages/library/standards.htm, pp. 2-7.*
Agilent Technologies, "An Overview of ITU-T G.709", Agilent Technologies, U.K. Ltd. 2001, pp. 1-12.*
Goodson, W.E.: "Use of Tandem Connection Maintenance For NI Maintenance Functions on SONET Paths" "Contribution to T1 Standards Project", http:t1.org/T1M1/M1.3/DIR98/, pp. 1-6, Feb. 9, 1998.
Draft ITU-T G.709, Feb. 2001.
Living List of Draft New Recommendation ITU-T G.798, Feb. 2001.

* cited by examiner

*Primary Examiner*—Patrice Winder
*Assistant Examiner*—Liang-che Alex Wang
(74) *Attorney, Agent, or Firm*—Ridout & Maybee LLP

(57) ABSTRACT

In a synchronous hierarchic network having multi-level tandem connection monitoring, all of the fields containing tandem connection monitoring information associated with trail terminations at a subject network element are processed in parallel at the subject network element. The network element extracts the tandem connection monitoring information from received signals independently for each of the tandem connection monitoring terminations occurring at the network element.

15 Claims, 2 Drawing Sheets

TANDEM CONNECTION MONITORING PARALLEL PROCESSING

FIELD OF INVENTION

The present invention is directed towards a tandem connection monitoring system and method for synchronous hierarchical networks.

BACKGROUND OF INVENTION

In networks, tandem connection monitoring can provide an administrative monitoring domain that operates independent of the end to end path. Tandem Connection Monitoring (TCM) is used in Synchronous Optical Network/Synchronous Digital Hierarchy (SONET/SDH) networks to support path monitoring between various tandem connected network elements. In accordance with existing ITU recommendations regarding SDH networks, TCM allows monitoring of the performance of path segments with the aid of the network operator bytes N1, N2 in the path over head (POH). The high-order and low-order POH parity bytes are evaluated by the network elements. The number of errors detected is indicated to the end of the TCM trail using the N1 or N2 byte. This error count is then recompared with the number of parity errors detected at the end of the TCM trail. The difference is the number of errors occurring within the TCM trail.

With the ever increasing use of hierarchal networks including many smaller networks that may be owned by different network operators, multi-level TCM has gained popularity as a means of improving network monitoring and operator accountability. The ITU has proposed requirements (ITU final draft recommendation ITU-T G.709) for Optical Transport Module (OTM) signals of an Optical Transport Network (OTN) that defines an Optical Channel Data Unit (ODU) frame structure having an overhead that includes portions dedicated to the end-to-end ODU path and six levels of tandem connection monitoring. The ODU path overhead is terminated where the ODU is assembled and disassembled. The TCM overhead is added and terminated at the source and sink of the corresponding tandem connections, respectively. In this regard, the ODUk path overhead includes six TCM fields such that the number of monitored connections along an ODU trail may vary between 0 and 6 and the monitored connections can be nested, overlapping, and/or cascaded.

In some instances, multiple trail terminations will be provided at a single network element. One proposed method of multi-level TCM processing at a single network element is to process the TCM data serially through the trail terminations existing at the network element. This can result in incorrect TCM results when terminating TCM trails overlap within the network element. For example, a first TCM trail may commence at a source located upstream of a mis-connection, and terminate at a sink in a network element located downstream of the mis-connection. A second TCM trail could commence and terminate downstream of the mis-connection, with the sink of the second TCM trail being at the same network element, but downstream of, the sink of the first TCM trail. Although no mis-connection actually existed in the second TCM trail, the sink of the first TCM trail would properly detect the mis-connection, and would generate a downstream Alarm Indication Signal (AIS). This AIS will be detected by the sink of the second TCM trail, causing it to generate a signal failure alarm for the second TCM trail even though the second TCM trail has not been directly affected by the mis-connection. Accordingly, in a system where TCM trail terminations are serially processed in a network element, the order in which TCM trails are added or dropped within the network element is critical as some configurations can result in unnecessary alarms. This reduces flexibility in configuring the transport system.

Thus, it is desirable to provide an improved Tandem Connection Monitoring system and method which is unaffected by the order in which trail termination points are added and dropped within a network element.

SUMMARY OF THE INVENTION

In accordance with the present invention, Tandem Connection Monitoring for each of the monitored connections terminating at a network element is performed independently of each other at the network element. This reduces the opportunity for information contained in one TCM field to inadvertently affect or cause the modification or over-writing of the information contained in another TCM field.

According to one aspect of the present invention, there is provided a method for processing tandem connection monitoring information in a synchronous hierarchic network system, including steps of (a) receiving at a network element a frame containing tandem connection monitoring information associated with a plurality of tandem connection trails having trail terminations at the network element; and (b) extracting from the frame the associated tandem connection monitoring information for each of the plurality of tandem connection trails having trail terminations at the network element prior to processing the tandem connection monitoring information for any of the tandem connection trails having trail terminations at the network element. Preferably, the extracted tandem connection monitoring information associated with the tandem connection trails is processed in parallel.

According to another aspect of the invention, there is provided a network element configured to be connected in a synchronous hierarchic network and receive signals containing tandem connection monitoring information associated with a plurality of tandem connection monitoring terminations occurring at the network element. The network element is further configured to extract from the received signals, independently for each of the tandem connection monitoring terminations occurring at the network element, the tandem connection monitoring information associated therewith.

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
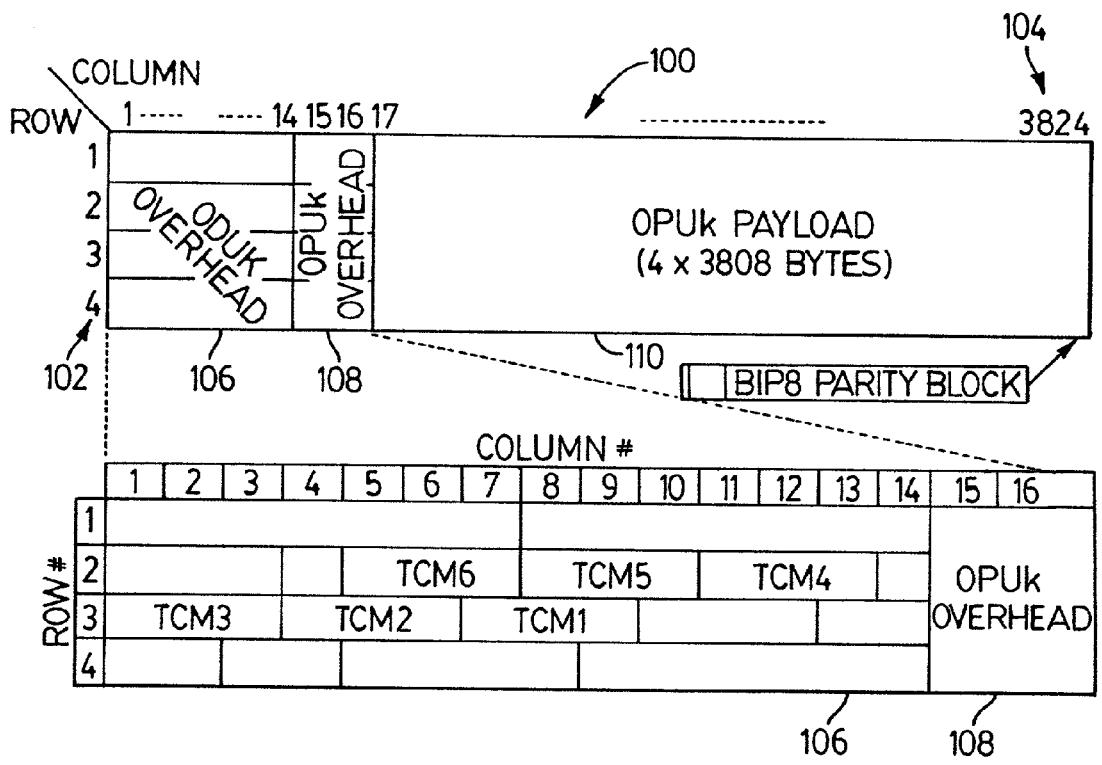
FIG. 1 shows the structure of a Optical Channel Data Unit (ODU) frame.

In a Optical Transport Network (OTN) in accordance with ITU final draft recommendation ITU-T G.709, data and overhead is transported in the format of an Optical Channel Transport Unit (OTU) that includes an Optical Channel Data Unit (ODU) and OTU related overhead such as forward error correction information. FIG. 1 shows the format of an ODUk frame 100 (where k indicates supported bit rate), which includes four (4) rows 102 and 3824 columns 104, giving a frame of 4×3824 bytes. The ODUk frame 100 includes a ODUk overhead portion 106, and Optical Channel Payload Unit overhead portion 108, and an Optical Channel Payload portion 110. As indicated in FIG. 1, the ODUk overhead 106 includes six (6) Tandem Connection Monitoring (TCM) fields TCM1–TCM6 that are dedicated to six levels of tandem connection monitoring. Tandem connection monitoring is intended to support monitoring of ODUk connections for, among other things, one or more of the following network applications: (a) optical User to Network Interface (UNI) to User to Network Interface (UNI) tandem connection monitoring—monitoring the ODUk connection through a public transport network (from public network Ingress Network Termination to Egress Network Termination); (b) optical Network Node Interface (NNI) to Network Node Interface (NNI) tandem connection monitoring—monitoring the ODUk connection through the network of a network operator (from operator network Ingress Network Termination to Egress Network Termination); (c) sublayer monitoring for linear 1+1, 1:1 and 1:n optical channel subnetwork connection protection switching, to determine Signal Fail and Signal Degrade conditions; (d) sublayer monitoring for optical channel shared protection ring (SPring) protection switching, to determine the Signal Fail and Signal Degrade conditions; (e) monitoring an optical channel tandem connection for the purpose of detecting a signal fail or signal degrade condition in a switched optical channel connection, to initiate automatic restoration of the connection during fault and error conditions in the network; and (f) monitoring an optical channel tandem connection for e.g. fault localisation or verification of delivered quality of service.

Figure 2:
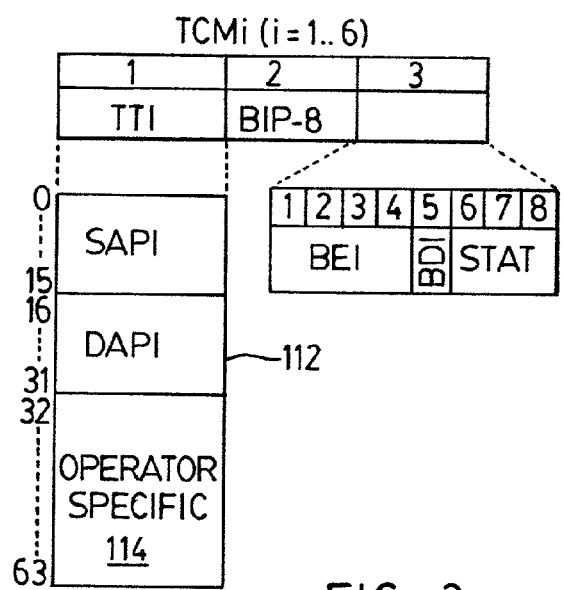
FIG. 2 shows the structure of a Tandem Connection Monitoring field of the ODU frame of FIG. 1.

With reference to FIG. 2, each TCMi (where i=1 . . . 6) field is 3 bytes long and includes the following sub-fields: (a) Trail Trace Identifier TTI; (b) Bit Interleaved Parity 8 BIP-8; (c) Backward Defect Indication BDI; (d) Backward Error indication BEI; and (e) Status bits indicating the presence of TCM overhead, Incoming Alignment Error, or a maintenance signal (STAT). The one byte Trail Trace Identifier field TTI is defined to transport a 64 byte TTI signal 112 broken up over a number of ODUk frames 100. The TTI signal 112 includes a Source Access Point Identifier sub-field SAPI identifying the tandem connection trail source point, a Destination Access Point Identifier sub-field DAPI identifying the expected tandem connection trail sink, and a network operator specific sub-field 114. The TCMi BIP-8 sub-field is a one byte Error Detection Code (EDC) signal. Each TCMi BIP-8 is computed at the TCM end point source over the bits in the OPUk overhead 108 and payload 110 fields (columns 15 to 3824) of ODUk frame 100(j) (where j indicates a frame location in a sequence of transmitted frames), and inserted in the ODUk TCMi BIP-8 location in the ODUk frame 100(j+2).

The TCMi Backward Defect Indication BDI sub-field is defined to convey a signal fail status detected in a tandem connection sink function in the upstream direction (ie. towards the source). The BDI sub-field is set to "1" to indicate an ODUk backward defect indication, otherwise it is set to "0".

For each tandem connection monitoring field TCMi, the 4-bit Backward Error Indication BEI sub-field is defined to convey in the upstream direction the count of interleaved-bit blocks that have been detected as being in error by the corresponding ODUk tandem connection monitoring sink using the BIP-8 code.

For each tandem connection monitoring field TCMi, the 3-bit status sub-field STAT is used to indicate the presence of a maintenance signal, if there is an incoming alignment error at the source tandem connection monitoring end point, or if there is no source tandem connection monitoring end point active. For example, at a path connection monitoring end point, the STAT bits can be set to "000" to indicate that there is no source tandem connection monitoring end point. At a tandem connection monitoring end point ingress (the TCM source), the STAT bits can be set to either "001" to indicate to its peer tandem connection monitoring end point egress (the TCM sink) that there is no incoming alignment error, or to "010" to indicate that there is an incoming alignment error. An egress tandem connection monitoring end point may use the STAT information to suppress the counting of bit errors, which may occur as a result of frame phase change of the ODUk at the ingress of the tandem connection.

In terms of maintenance signals, three types of maintenance signals are monitored for, namely an ODUk-Alarm Indication Signal (AIS); an ODUk-Open Connection Indication (OCI); and an ODUk-Locked (LCK). An ODUk-AIS is specified as all "1"s, ODUk-OCI is specified as "110" pattern, and ODUk-LCK is specified as "101" in the STAT sub-field. An ODUk-Alarm Indication Signal (AIS) is a signal sent downstream (ie. away from the source) as an indication that an upstream defect has been detected. An AIS signal is generated in an adaptation sink function. An AIS signal is detected in a tandem connection monitoring trail termination sink function to suppress defects or failures that would otherwise be detected as a consequence of the interruption of the transport of the original signal at an upstream point. An ODUk-Open Connection Indication (OCI) is a signal sent downstream as an indication that upstream the signal is not connected to a trail termination source. An OCI signal is generated in a connection function and output by this connection function on each of its output connection points, which are not connected to one of its input connection points. An OCI signal is detected in a tandem connection monitoring trail termination sink function. A ODUk-Locked (LCK) is a signal sent downstream as an indication that upstream the connection is "locked", and no client data is passed through.

The ODUk frame structure 100 supports up to six levels of tandem connection monitoring, such that the number of monitored connections along an ODUk trail may vary between 1 and 6. Each tandem connection monitoring end point along a path will be inserting/extracting its corresponding tandem connection monitoring overhead from one of the 6 TCMi fields. TCM trails and the specific TCMi field assigned to such trails are provisioned by a network operator, network management system or switching control plane.

Figure 3:
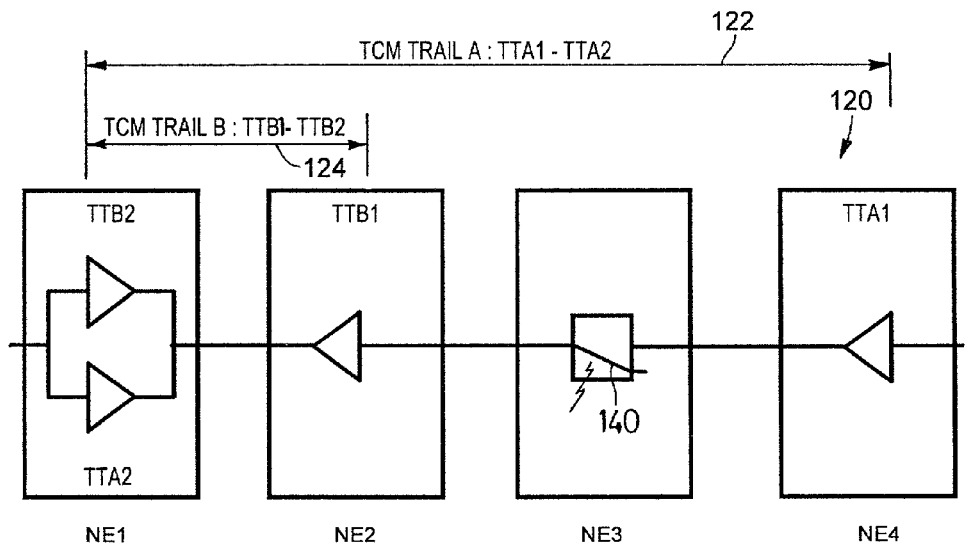
FIG. 3 is a block diagram of an optical network having a network element according to embodiments of the present invention.

An illustrative example of a synchronous optical network 120 containing tandem connected segments in accordance with the present invention is shown in FIG. 3. The configuration shown in FIG. 3 is representative of one possible embodiment of the invention, however as will be appreciated from the present description, the tandem connection monitoring system and method of the present invention could be used in a number of different network configurations. The optical network 120 includes a number of tandem connected network elements NE1 to NE4. A first tandem connection monitored trail 122 TCM Trail A is established between network element NE4 and network element NE1. A tandem connection monitoring trail termination TTA1 at network element NE4 functions as the TCM Trail A source function, and a tandem connection monitoring trail termination TTA2 at network element NE1 functions as the TCM Trail A sink function. The TCM Trail A extends over a number of network segments, including network element NE4 to network element NE3, network element NE3 to network element NE2, and network element NE2 to network element NE1. A second tandem connection monitored trail 124 TCM Trail B is established between network element NE2 and network element NE1. A tandem connection monitoring trail termination TTB1 at network element NE2 functions as the TCM Trail B source function, and a tandem connection monitoring trail termination TTB2 at network element NE1 functions as the TCM trail B sink function. In the illustrated example tandem connection monitoring field $TCM_x$ is assigned for monitoring of TCM Trail A and tandem connection monitoring field $TCM_{x+1}$ is assigned for monitoring of TCM Trail B (where x=1 . . . 5 and depends on TCM trails assigned to other monitored trails within the network that are not illustrated in FIG. 3).

As can be appreciated from FIG. 3, both TCM Trail A 122 and TCM Trail B 124 include tandem connection monitoring end points, namely trail terminations TTA2 and TTB2, respectively, at network element NE1. According to embodiments of the present invention, the information contained in the TCM fields associated with all the tandem connection monitoring end points at a given network element are processed in parallel such that the information contained in the TCM fields are evaluated independently of each other. In one preferred embodiment, a suitably designed and configured ASIC is used to implement the tandem connection monitoring trail end points TTA2 and TTB2 in the network element NE1. However, the present invention is not limited to an ASIC implementation, and could be implemented using other configurations, such as a suitably programmed microprocessor and memory, programable logic devices, suitable combination of electronic components, or combinations of the forgoing.

Figure 4:
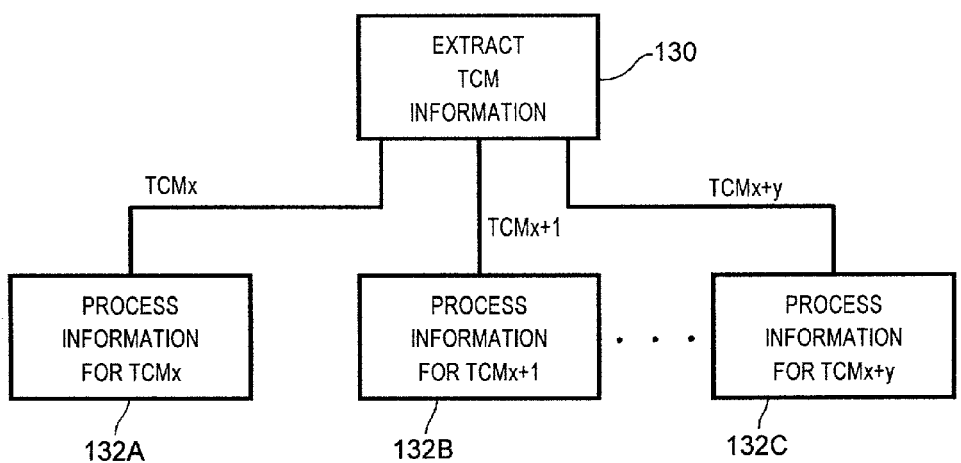
FIG. 4 is a flow chart showing processing steps of Tandem Connection Monitoring fields having an monitoring end point at a common network element.

The flowchart of FIG. 4 shows the TCM data processing steps that are performed in a subject network element such as the network element NE1 in accordance with embodiments of the present invention. As indicated in box 130, after conversion of the optical signal to an electrical signal at the subject network element, the information contained in each of the tandem connection monitoring fields TCMi for which a tandem connection monitoring trail termination is located at the subject network element is extracted from the ODUk overhead 106. As indicated in boxes 132A to 132C, the information extracted from each of the relevant TCM fields is then processed independently of data extracted from each of the other relevant TCM fields—in particular, the information extracted from tandem connection monitoring $TCM_x$, $TCM_{x+1}$, . . . , $TCM_{x+y}$ fields are each processed in the subject network element independently of each other (where the tandem connection monitoring trails associated with the $TCM_x$, $TCM_{x+1}$, . . . , $TCM_{x+y}$ fields each terminate at the subject network element).

Turning again to the illustrative network of FIG. 3, as noted above, two tandem connection monitoring end points (terminations) TTA2 and TTB2 are located at the network element NE1, and in the present embodiment, both are egress points. Thus in step 130 of FIG. 4, the information contained in both tandem connection monitoring field $TCM_x$ (which had been assigned to TCM trail A) and tandem connection monitoring field $TCM_{x+1}$ (which had been assigned to TCM trail B) is extracted from incoming ODUk frames 106 prior to processing of such TCM information. In steps 132A and 132B, the information extracted from the $TCM_x$ and $TCM_{x+1}$ fields, respectively, is processed in parallel at the network element NE1. In particular, in respect of the information in $TCM_x$ field, the corresponding TTI subfield is checked over successive data frames to ensure that SAPI and DAPI information is as expected. The value in the BIP-8 field (which would have been calculated at trail termination TTA1 in respect of the $2^{nd}$ preceding OPUk frame) is compared with the BIP-8 value calculated at the network element NE1 in respect of the $2^{nd}$ preceding OPUk frame (ie. OPUk frame$_{x-2}$) transmitted along the TCM trail. The STAT bits of the $TCM_x$ field are monitored to determine if the bits have been set at trail termination source TTA1 to indicate that an incoming alignment error exists or not, or to indicate an ODUk-LCK, ODUk-OCI or ODU-AIS maintenance signal. In the event that the trail termination TTA2 also acts as a TCM source with corresponding trail termination TTA1 acting as a sink (for example, in a bi-directional network), the backward defect indication bit BDI is monitored to determine if a signal fail status has been detected at corresponding trail monitoring termination TTA1, and the backward error indication sub-field BEI is monitored to determine the number of interleaved bit-blocks that have been detected in error by a corresponding trail termination TTA1. Based on the results of such monitoring, appropriate reports are made to the network manager that oversees the network element NE1, and appropriate signals inserted into the ODUk frame as required. For example, if such monitoring detects an upstream defect, an ODUk Alarm Indication Signal will be inserted into the ODUk frame (in particular, in the event of an ODUk AIS, with the exception of certain predetermined overhead sub-fields the entire ODUk frame, including all TCM fields will be specified as all "1"s). The information contained in the $TCM_{x+1}$ field in respect of TCM Trail B is monitored in a similar manner at the network element NE1 independently of the information contained in the $TCM_x$ field, and the results of such monitoring reported to the appropriate network manager, and appropriate signals inserted into the ODUk overhead as required.

Extraction of the TCM information for all tandem trails terminating at the network element prior to processing of such information is advantageous as it reduces the opportunity for information contained in one TCM field to inadvertently affect or cause the modification or over-writing of the information contained in another TCM field prior to processing of the information such another TCM field. To further explain this advantage, with reference to FIG. 3, the situation where a mis-connection exists at the network element NE3 will now be discussed. The mis-connection in network element NE3 directly affects the TCM Trail A, but does not directly affect TCM Trail B. At network element NE1, extraction and processing of the information in located at the field $TCM_x$ associated with TCM Trail A indicates an upstream defect, resulting in reporting of the defect detection to the network manager, and generation of a downstream ODUk-AIS signal. However, extraction and processing of the information located at the field $TCM_{x+1}$ associated with TCM Trail B indicates that there is no problems with TCM trail B. This can be compared to a configuration in which the tandem connection monitoring information is extracted and processed serially in network element NE1. If the TCM trail termination TTB2 is located downstream of the TCM trail termination TTA2, then the ODUk-AIS generated by the trail termination TTA2 will over-write with all "1"'s the field $TCM_{x+1}$ associated with the TCM Trail B, prior to the information contained in such field being extracted and processed at the network element NE1. As a result, the information inserted in the field $TCM_{x+1}$ at the TCM trail termination source TTB1 is lost, and the TCM trail termination sink TTB2 detects and reports the presence of an ODUk-AIS signal even though the TCM Trail B was not actually directly affected by the mis-connection at network element NE3. Thus, if serial TCM field extraction is used at the network element NE1, then the TCM trail termination TTB2 would have to be located upstream of the TCM trail termination TTA2 in order to avoid the corruption of data noted above. Such a requirement can reduce flexibility in adding and dropping TCM terminations within a network element, and increase the risk of a unnecessary alarms being generated in the event that a TCM termination is mis positioned. Conversely, parallel extraction at a network element of information from all TCM fields associated with TCM trails terminating at the network element, according to embodiments of the present invention, greatly reduces the possibility that unread information from one TCM field will be corrupted as the result of processing of information from another TCM field, thereby removing a constraint on the order in which TCM trail terminations are added and dropped in network elements.

While exemplary systems and methods embodying the present invention are shown by way of example, it will be understood that the invention is not limited to these embodiments. Modifications may be made by those skilled in the art, particularly in light of the forgoing teachings. For example, although the invention has been described in the context of a specific optical channel data unit frame structure, the present invention could also be used with systems employing different frame structures that contained multi-level TCM data, and the data contained in the TCM fields could vary from that described above.

The invention claimed is:

1. A method for processing tandem connection monitoring information in a synchronous hierarchic network system, comprising:
   (a) receiving, at a network element, a frame containing tandem connection monitoring information including a plurality of TCM fields, each TCM field being associated with one of a plurality of tandem connection trails having trail terminations at the network element;
   (b) extracting from the frame the associated tandem connection monitoring information for each of the plurality of tandem connection trails having trail terminations at the network element; and
   (c) processing, in parallel, the tandem connection monitoring information for any of the tandem connection trails having trail terminations at the network element.

2. The method of claim 1 wherein the tandem connection monitoring information associated with each of the tandem connection trails includes trail trace identification information.

3. The method of claim 2 wherein the trail trace information is broken up for transmission over a number of successive frames and includes source access point identifier information identifying a source of the tandem connection monitoring information.

4. The method of claim 1 wherein the tandem connection monitoring information associated with each of the tandem connection trails includes a Bit-Interleaved Parity-8 (BIP-8) code computed at the source of each of the tandem connection trails based on payload information in a previously sent frame.

5. The method of claim 1 wherein the tandem connection monitoring information associated with each of the tandem connections trails includes status bits carrying information indicating upstream conditions.

6. The method of claim 1 wherein the number of tandem connection monitoring terminations at the network element is from two to six.

7. The method of claim 1 wherein the frame includes a plurality of sub-fields each dedicated to carrying the tandem connection monitoring information associated with a predetermined tandem connection monitored trail.

8. A network element configured to:
   be connected in a synchronous hierarchic network,
   receive signals containing tandem connection monitoring information including a plurality of TCM fields, each TCM field being associated with one of a plurality of tandem connection monitoring terminations occurring at the network element, and
   extract, in parallel, from the received signals, independently for each of the tandem connection monitoring terminations occurring at the network element, the tandem connection monitoring information associated therewith.

9. The network element of claim 8 wherein the network element is configured to extract the tandem connection monitoring information prior to any modification of data included in the received signals.

10. The network element of claim 9 wherein the received signals include frames having predetermined overhead locations dedicated to the tandem connection monitoring information.

11. The network element of claim 9 further configured to monitor in parallel the extracted tandem connection monitoring information associated with tandem connection monitoring trails terminating at the network element.

12. In a synchronous hierarchical network having multiple levels of tandem connection monitoring, a method comprising the steps of:
   (a) receiving at a network element a signal containing a frame having first tandem connection monitoring information in a first TCM field in respect of a first tandem connection monitoring trail terminating at the network element and second tandem connection monitoring information in a second TCM field in respect of a second tandem connection monitoring trail terminating at the network element; and
   (b) processing at the network element the first tandem connection monitoring information in parallel with the second tandem connection monitoring information.

13. The method of claim 12 wherein the signal includes tandem connection monitoring information for more than two tandem connection monitoring trails terminating at the network element and all of the tandem connection monitoring information in respect of each of the terminating connection monitoring trails is processed in parallel at the network element.

14. The method of claim 13 wherein the tandem connection monitoring information associated with each of the tandem connection monitoring trails includes trail trace identification information.

15. The method of claim 14 wherein the trail trace information is broken up for transmission over a number of successive frames and includes source access point identifier information identifying a source of the tandem connector monitoring information.

* * * * *